(12) United States Patent
Song et al.

(10) Patent No.: US 12,179,345 B2
(45) Date of Patent: Dec. 31, 2024

(54) BRAKE ASSEMBLY, JOINT ACTUATOR AND ROBOT

(71) Applicant: SHANGHAI FLEXIV ROBOTICS TECHNOLOGY CO., LTD., Shanghai (CN)

(72) Inventors: Tingke Song, Shanghai (CN); Xuan Wang, Shanghai (CN); Ran An, Santa Clara, CA (US)

(73) Assignee: SHANGHAI FLEXIV ROBOTICS TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/782,885

(22) PCT Filed: Mar. 14, 2022

(86) PCT No.: PCT/CN2022/080559
§ 371 (c)(1),
(2) Date: Jun. 6, 2022

(87) PCT Pub. No.: WO2023/115720
PCT Pub. Date: Jun. 29, 2023

(65) Prior Publication Data
US 2024/0181660 A1 Jun. 6, 2024

(30) Foreign Application Priority Data
Dec. 21, 2021 (CN) .......................... 202111571075.1

(51) Int. Cl.
*B25J 19/00* (2006.01)
*F16D 55/22* (2006.01)
(Continued)

(52) U.S. Cl.
CPC .......... *B25J 19/0004* (2013.01); *F16D 55/22* (2013.01); *F16D 65/122* (2013.01);
(Continued)

(58) Field of Classification Search
CPC ......... B25J 9/12; B25J 19/0004; F16D 55/22; F16D 65/122; F16D 65/123;
(Continued)

(56) References Cited

U.S. PATENT DOCUMENTS 2,911,548 A * 11/1959 Joy ...................... H02K 7/1025
318/765
5,936,324 A * 8/1999 Montagu .............. H02K 1/2726
310/156.11
(Continued)

FOREIGN PATENT DOCUMENTS

CN 2742221 Y 11/2005
CN 203086290 U 7/2013
(Continued)

OTHER PUBLICATIONS

English translation of CN 110645291 A (Year: 2020).*
(Continued)

*Primary Examiner* — Joseph Brown
(74) *Attorney, Agent, or Firm* — Dorsey & Whitney LLP

(57) ABSTRACT

A brake assembly includes: a motor rotor; a brake disc fixed on the motor rotor; a friction plate fixed to and surrounding the brake disc; a bearing rotatably sleeved on the motor rotor; an electromagnet assembly fixed on the bearing; a baffle plate fixed to the electromagnet assembly; an armature slidably sleeved on the motor rotor, and located between the baffle plate and the electromagnet assembly; and a spring assembly provided between the armature and the electromagnet assembly. When the electromagnet assembly is de-energized, the armature is pushed by the spring assembly to move in a direction close to the baffle plate, such that the friction plate is clamped by the armature and the baffle plate to realize braking.

18 Claims, 7 Drawing Sheets

(51) Int. Cl.
*F16D 65/12* (2006.01)
*F16D 65/18* (2006.01)
*B25J 9/12* (2006.01)
*F16D 65/02* (2006.01)
*F16D 121/22* (2012.01)

(52) U.S. Cl.
CPC ......... *F16D 65/123* (2013.01); *F16D 65/125* (2013.01); *F16D 65/186* (2013.01); *B25J 9/12* (2013.01); *F16D 2065/1324* (2013.01); *F16D 2065/1388* (2013.01); *F16D 2065/1392* (2013.01); *F16D 2121/22* (2013.01); *F16D 2250/0069* (2013.01)

(58) Field of Classification Search
CPC ................ F16D 65/125; F16D 65/186; F16D 2065/1324; F16D 2065/1388; F16D 2065/1392; F16D 2121/22; F16D 2250/0069; H02K 7/1025
See application file for complete search history.

(56) References Cited

U.S. PATENT DOCUMENTS

| | | | | |
|---|---|---|---|---|
| 6,293,372 | B1* | 9/2001 | Lorenz | F16D 65/0006 188/72.3 |
| 9,677,602 | B1* | 6/2017 | Baghdasarian | B25J 19/0004 |
| 2006/0192453 | A1* | 8/2006 | Gieras | F16D 59/02 310/112 |
| 2008/0135359 | A1 | 6/2008 | Basirico et al. | |
| 2013/0039730 | A1* | 2/2013 | Sueyoshi | B25J 9/047 188/72.3 |
| 2016/0089780 | A1* | 3/2016 | Marttinen | F16D 25/0638 901/23 |
| 2019/0046283 | A1* | 2/2019 | Nagao | B25J 19/0004 |
| 2019/0344437 | A1* | 11/2019 | Shinagawa | F16D 63/002 |
| 2020/0331152 | A1* | 10/2020 | Eriksson | F16D 59/02 |
| 2020/0346343 | A1* | 11/2020 | Li | H01F 7/14 |
| 2022/0275844 | A1* | 9/2022 | Skorski | F16D 65/186 |

FOREIGN PATENT DOCUMENTS

| | | |
|---|---|---|
| CN | 103618409 A | 3/2014 |
| CN | 107401563 A | 11/2017 |
| CN | 110645291 A | 1/2020 |
| CN | 210137245 U | 3/2020 |
| CN | 210484463 U | 5/2020 |
| CN | 210704822 U | 6/2020 |
| CN | 114083577 A | 2/2022 |
| EP | 2878846 A1 | 6/2015 |
| GB | 754805 A | 8/1956 |
| JP | 2004153899 A | 5/2004 |
| JP | 2018031406 A | 3/2018 |
| TW | M529090 U | 9/2016 |

OTHER PUBLICATIONS

Wikipedia contributors. Dec. 19, 2021). Ball bearing. In Wikipedia, The Free Encyclopedia. Retrieved 19:51, May 7, 2024, from https://en.wikipedia.org/w/index.php?title=Ball_bearing&oldid=1061025063 (Year: 2021).*

International Search Report from International Application No. PCT/CN2022/080599 mailed May 26, 2022.

* cited by examiner

BRAKE ASSEMBLY, JOINT ACTUATOR AND ROBOT

CROSS REFERENCE TO RELATED APPLICATION

This application is a U.S. National Stage Application of PCT International Application No. PCT/CN2022/080559 filed on 14 Mar. 2022, which claims priority to Chinese Patent Application No. 2021115710751, entitled "BRAKE ASSEMBLY, JOINT ACTUATOR AND ROBOT", filed on Dec. 21, 2021, the entire content of each of which is incorporated herein by reference.

TECHNICAL FIELD

The present disclosure relates to the field of brake technology, in particular to a brake assembly, a joint actuator, and a robot.

BACKGROUND

Industrial robots are called automatic controlled reprogrammable multipurpose manipulators. An industrial robot may be configured with multiple degrees of freedom and to perform tasks independently. The industrial robot may have several axes, each powered by an actuator such as a motor. The movement of each motor can be stopped by actuating a brake that prevents the motor from moving.

A conventional brake mechanism includes a friction member configured to be fixed to a motor rotor; a brake member abutting against one side of the friction member; a thrust member abutting against the other side of the friction member for providing a thrust force for the brake member, and the thrust force of the thrust member to the brake member being adjustable; and a locking mechanism for preventing the brake member from rotating in accordance with the brake instruction. The locking mechanism includes a striker and a driving member connected together, an outer ring of the brake member is provided with a brake tooth, and the driving member is configured to drive the striker to extend and retract such that the striker can reach out and be in contact with the brake tooth in response to the brake command, thereby preventing the brake member from rotating.

This multi-disc brake allows braking, but also has some obvious drawbacks:

1. Too much axial space is occupied and the weight in the circumferential direction is distributed unevenly.

Because the electromagnetic switch is mounted along an axial direction, the overall axial dimension of the joint will be larger, and the structure type and mounting of other parts will be affected. The axial space inside the joint is very limited and the structure is not compact enough.

2. The collision reliability and the service life of the brake are low.

As the number of collisions increases, the collision positions between the striker and the brake tooth will wear out and a lot of small pits and debris will be generated, which will lead to lower reliability and lower service life.

SUMMARY

According to some embodiments, a brake assembly, a joint actuator and a robot are provided.

A brake assembly includes: a motor rotor; a brake disc fixed on the motor rotor; a friction plate fixed to and surrounding the brake disc; a bearing rotatably sleeved on the motor rotor; an electromagnet assembly fixed on the bearing; a baffle plate fixed to the electromagnet assembly and located on one side of the friction plate; an armature slidably sleeved on the motor rotor, located on the other side of the friction plate, and located between the baffle plate and the electromagnet assembly; and a spring assembly arranged between the armature and the electromagnet assembly. When the electromagnet assembly is de-energized, the armature is pushed by the spring assembly to move in a direction close to the baffle plate, such that the friction plate is clamped by the armature and the baffle plate to realize braking.

A joint actuator includes a motor and the aforementioned brake assembly.

A robot includes the aforementioned joint actuator.

The details of one or more embodiments of the present disclosure are set forth in the accompanying drawings and the description below. Other features, objects and advantages of the present disclosure will become apparent from the description, drawings and claims.

BRIEF DESCRIPTION OF THE DRAWINGS

The above and other objects and features of the present invention will become apparent and more readily appreciated from the following description of the embodiments with reference to the following figures, wherein like reference numerals refer to like parts throughout the various figures unless otherwise specified.

DETAILED DESCRIPTION OF THE EMBODIMENTS

In order to make the objectives, technical solutions and advantages of the present disclosure clearer, the present disclosure will be further described in detail below with reference to the accompanying drawings and specific embodiments. It should be understood that the specific embodiments described herein are only used to explain the present disclosure, and do not limit the protection scope of the present disclosure.

It should be understood that when an element is defined as "fixed to" another element, it is either directly on an element or indirectly on an element with a mediating element. When an element is considered to be "connected" to another element, it can be directly connected to another element or indirectly connected to another element with a mediating element. When an element is considered to be "abutting against" another element, it can be directly abutting against the other element or intervening elements may also be present. The terms "vertical", "horizontal", "left", "right", and the like used herein are for illustrative purposes only and are not intended to be the only embodiment.

Unless otherwise defined, all technical and scientific terms used herein have the same meaning as commonly understood by one of ordinary skill in the technical field to which the present disclosure belongs. The terms used herein in the specification of the present disclosure are for the purpose of describing particular embodiments only, and are not intended to limit the present disclosure. The term "and/or" used herein includes any and all combinations of one or more of the associated listed items.

Figure 1:
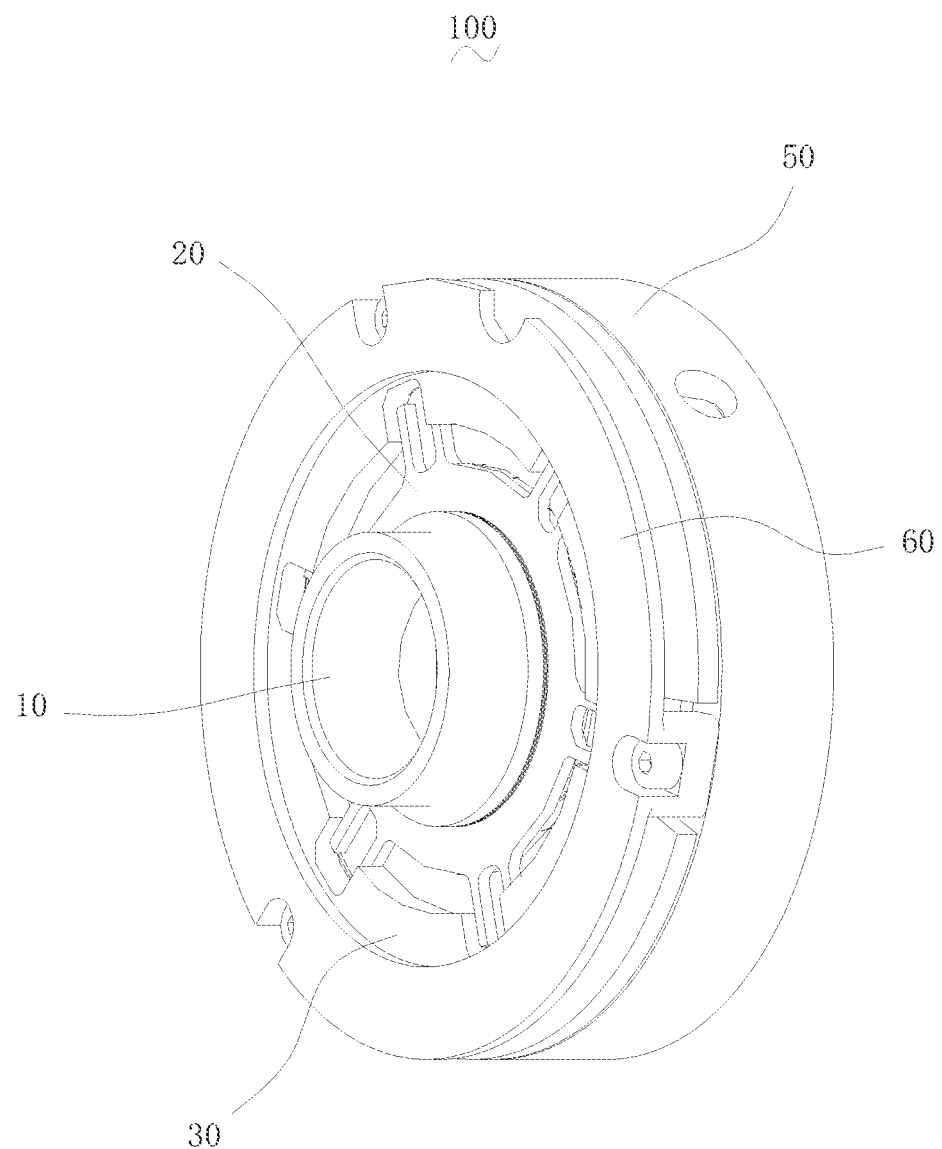
FIG. 1 is a perspective view of a brake assembly according to an embodiment.
Figure 2:
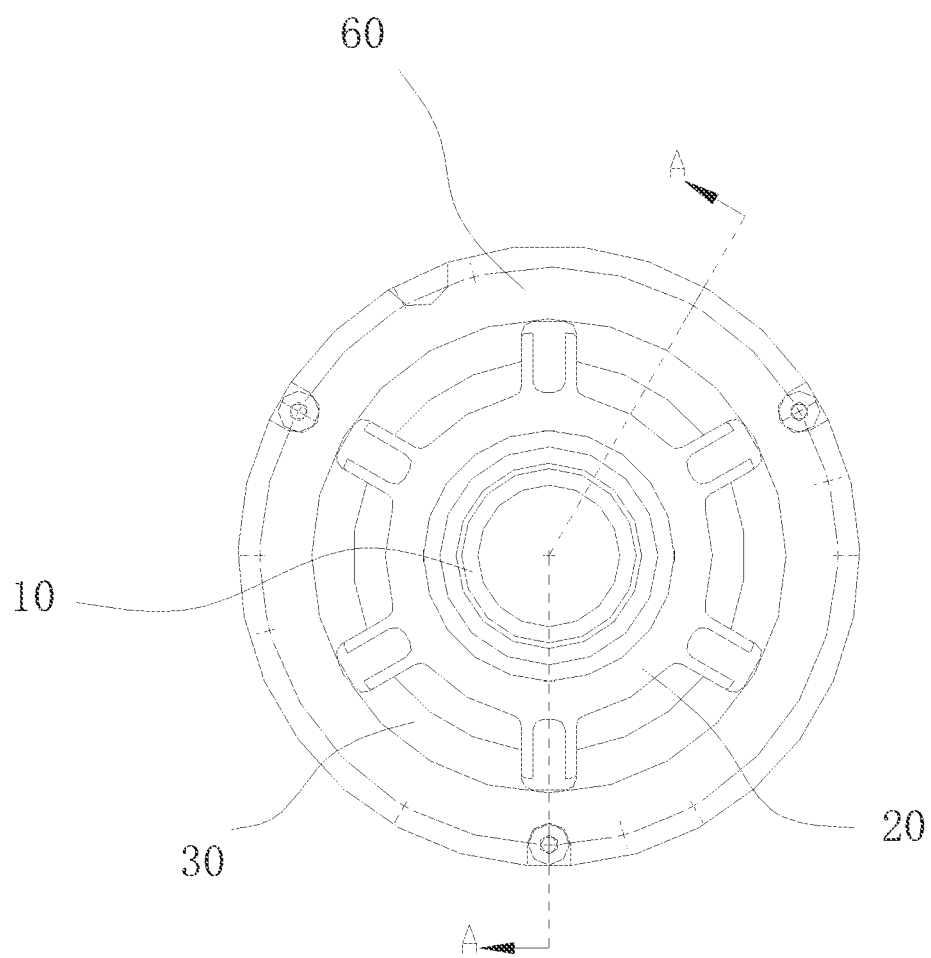
FIG. 2 is a front view of the brake assembly of FIG. 1.
Figure 3:
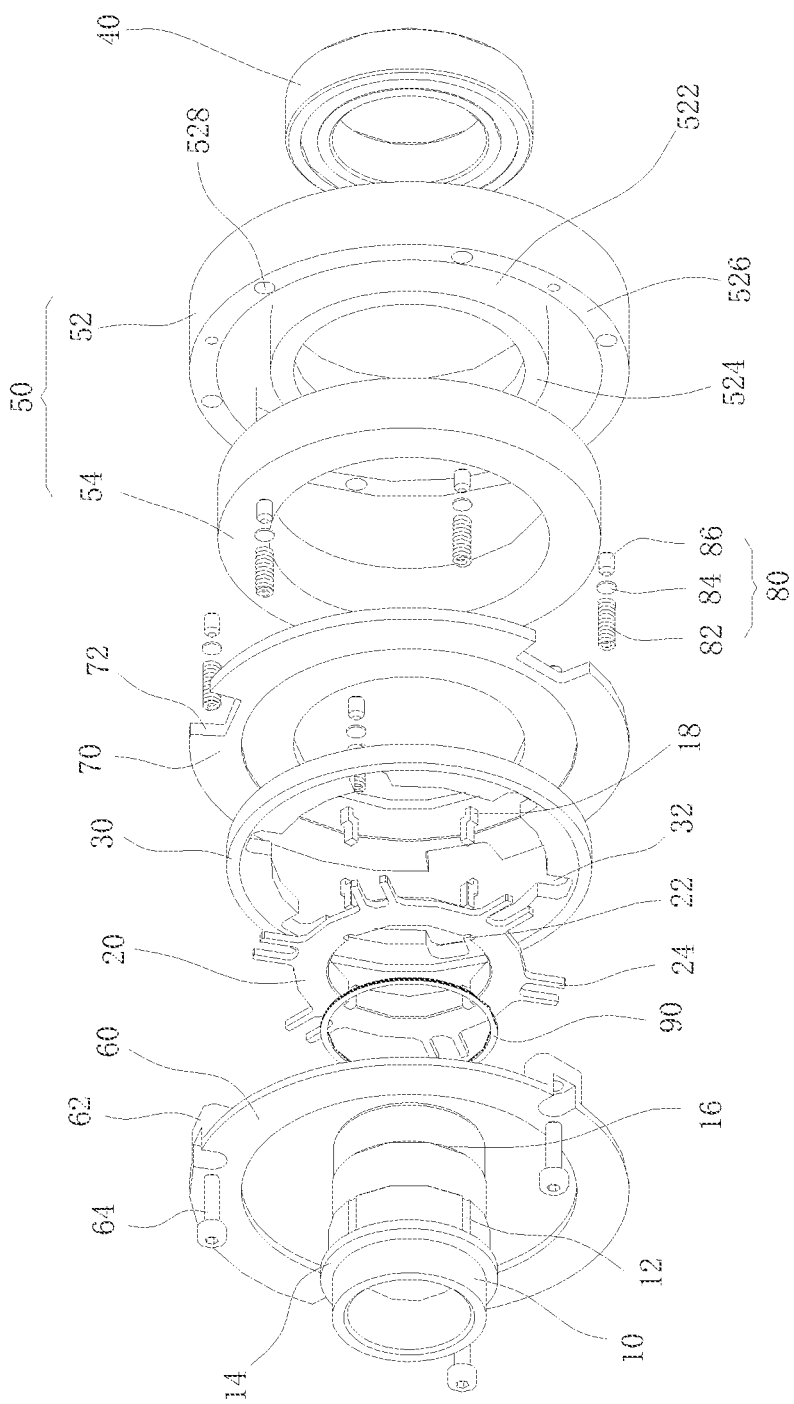
FIG. 3 is a perspective exploded view of the brake assembly of FIG. 1.

Referring to FIGS. 1 to 3, according to an embodiment of the present disclosure, a brake assembly 100 for a robot is provided, which includes a motor rotor 10, a brake disc 20, a friction plate 30, a bearing 40, an electromagnet assembly 50, a baffle plate 60, an armature 70, and a spring assembly 80. The brake disc 20 and the friction plate 30 are sleeved and fixed on the motor rotor 10. The bearing 40 is movably sleeved on the motor rotor 10. The electromagnet assembly 50, the baffle plate 60, and the armature 70 are fixed to the bearing 40.

Figure 7:
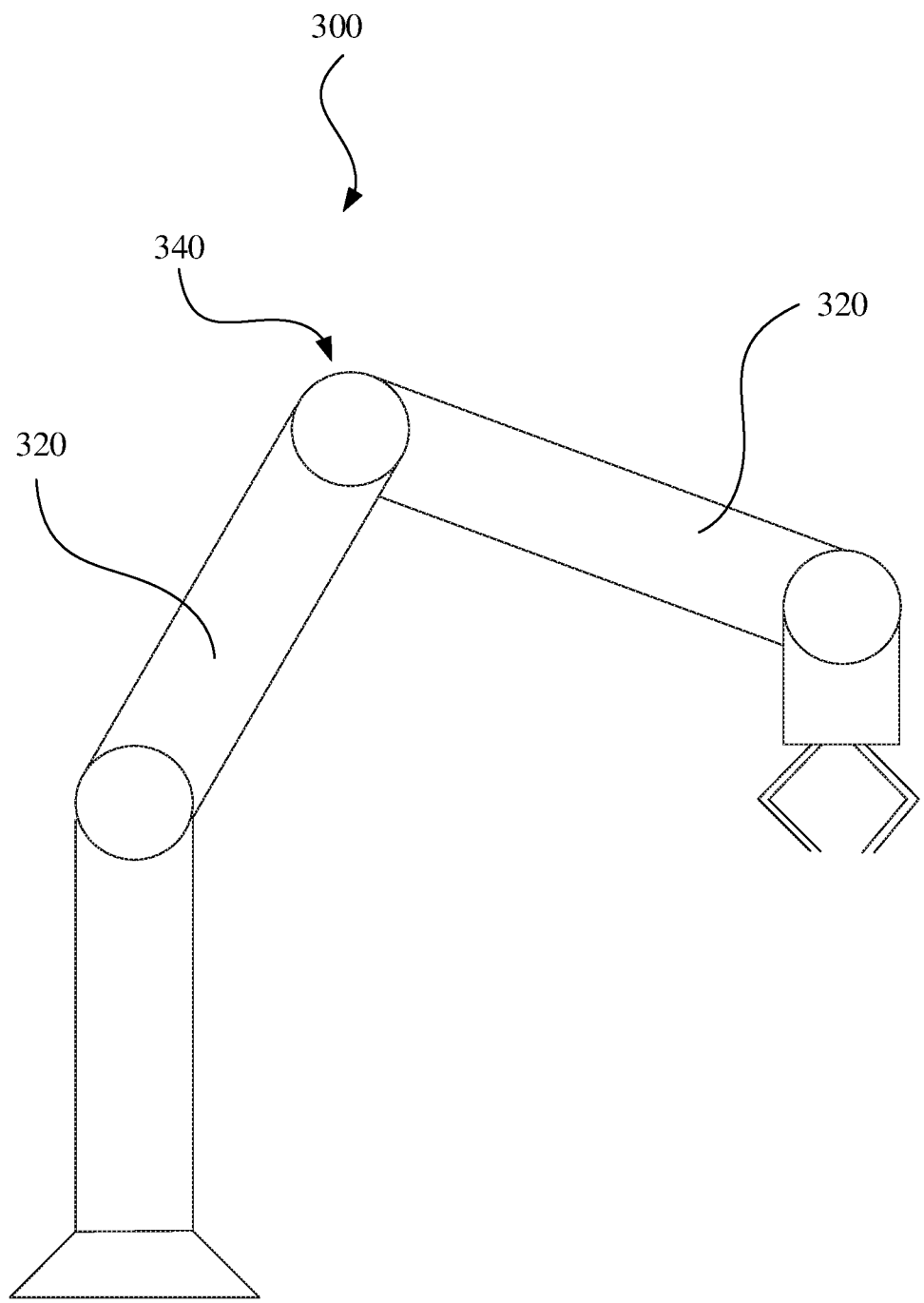
FIG. 7 is a schematic view of a robot according to an embodiment.

As shown in FIG. 3, the motor rotor 10 is a cylindrical shaft extending from a motor 230 (see FIG. 7). The motor rotor 10 is provided with a plurality of key slots 12 extending axially. In this embodiment, four key slots 12 are evenly spaced and distributed on a circumferential surface of the motor rotor 10. The brake disc 20 has a substantially annular shape, and an inner edge of the brake disc 20 is provided with a plurality of positioning grooves 22 corresponding to the plurality of key slots 12. The brake assembly 100 also includes a plurality of fixing keys 18. The fixing key 18 is inserted into both the key slot 12 and the positioning groove 22, such that the brake disc 20 is fixed on the motor rotor 10 via the fixing key 18, and the brake disc 20 rotates together with the motor rotor 10. In this embodiment, the fixing key 18 is a hook-head key, which can realize accurate positioning in three directions: radial, circumferential, and axial. In addition, the fixing key 18 is in an interference fit with the motor rotor 10. During mounting, both sides of the fixing key 18 are coated with a first adhesive layer and then pressed into the key slot 12 to enhance the stability and reliability of the structure. Specifically, the first adhesive may be LOC-TITE 609 glue.

Figure 4:
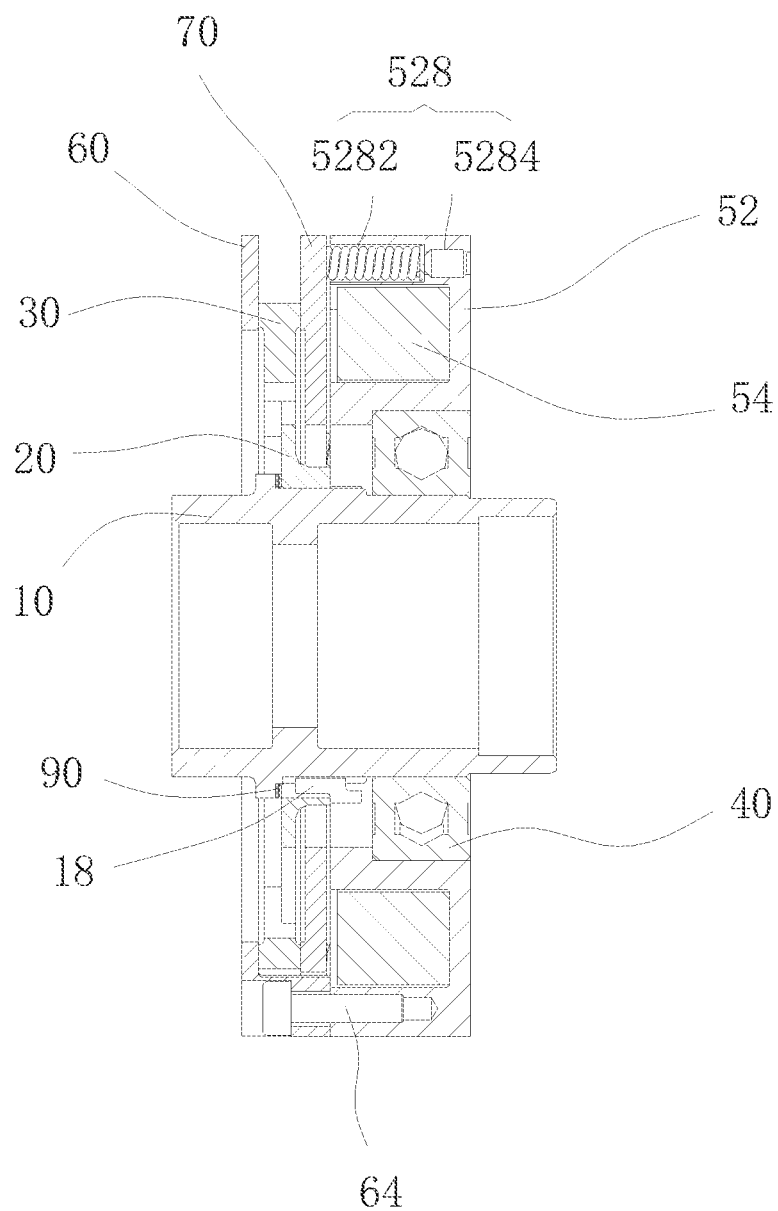
FIG. 4 is a cross-sectional view taken along line A-A in FIG. 2.

Referring to FIG. 3 and FIG. 4 together, the motor rotor 10 is further provided with a first positioning boss 14 having an annular shape. The brake assembly 100 also includes a washer 90. The washer 90 is located between the first positioning boss 14 and the brake disc 20 for adjusting the position of the brake disc 20 in an axial direction of the motor rotor 10. Since an outer diameter of the first positioning boss 14 is greater than an inner diameter of the brake disc 20, the brake disc 20 is capable of abutting against the first positioning boss 14 via the washer 90, thereby realizing the positioning of the brake disc 20 in the axial direction of the motor rotor 10.

Figure 5:
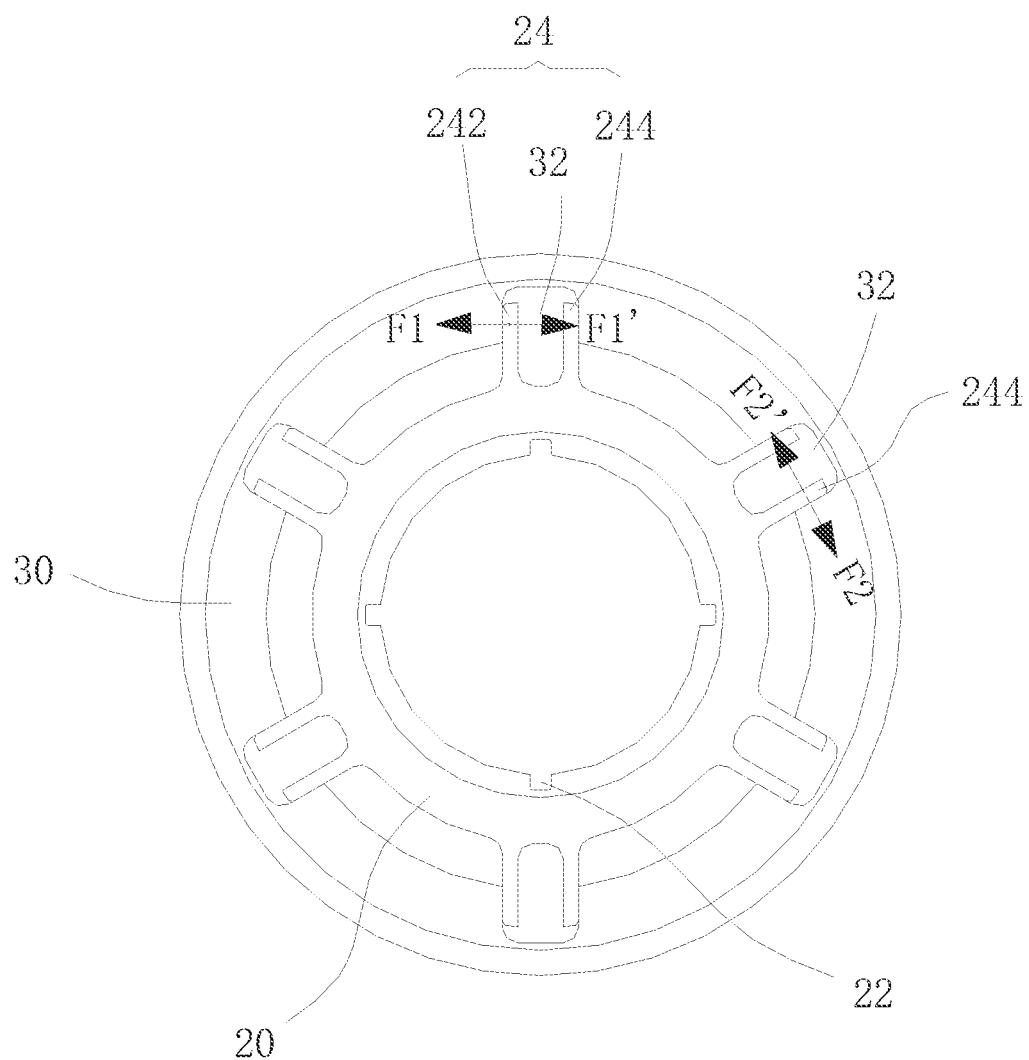
FIG. 5 is a schematic view illustrating a combination of a friction plate and a brake disc.

Referring to FIG. 3 and FIG. 5 together, the brake disc 20 having a substantially annular shape can be made of metal material. The friction plate 30 has a substantially annular shape, and is fixed to the brake disc 20 and surrounds the brake disc 20. The friction plate 30 is coplanar with the brake disc 20. The friction plate 30 can be made of non-metallic materials, such as ceramics, rubber, or other engineering plastics with suitable friction coefficient. An outer edge of the brake disc 20 extends radially to form blades 24, and an inner edge of the friction plate 30 defines a receiving groove 32 to receive the blades 24. In this embodiment, the blade 24 is substantially U-shaped, and includes two fork arms 242 and 244 that are spaced apart and parallel to each other. The two fork arms 242 and 244 are in contact with two opposite side walls of the receiving groove 32, respectively. In this embodiment, a number of the blades 24 is six, and the six blades 24 are evenly and symmetrically distributed on the outer edge of the brake disc 20 at intervals of 60°. The number and positions of the receiving grooves 32 are in one-to-one correspondence to the blades 24.

When the motor rotor 10 accelerates and rotates counterclockwise from a standstill, the brake disc 20 will start to accelerate and rotate along with the motor rotor 10, and the fork arm 242 will generate pressure F1 on one side wall of the receiving groove 32 to drive the friction plate 30 rotate together. When the friction plate 30 is clamped by the armature 70 and the baffle 60 to realize braking, the side wall of the receiving groove 32 will generate a pressure F1' on the fork arm 242. Since the fork arm 242 has a structure of elongated rod, and the brake disc 20 is made of material with good flexibility, when the friction plate 30 is clamped by the armature 70 and the baffle plate 60 and stops rotating, the six fork arms 242 will be subjected to a resistance F1' from the six receiving grooves 32 (the F1' subjected to each fork arm 242 is different), different degrees of bending deformation (deflection) will be generated. Afterwards, the fork arm 242 will return to its initial state due to its own elastic force, and the motor rotor 10 stops rotating. In a similar way, when the motor rotor 10 accelerates and rotates counterclockwise from a standstill, the brake disc 20 will start to accelerate and rotate along with the motor rotor 10, and the fork arm 244 will generate pressure F2 on one side wall of the receiving groove 32 to drive the friction plate 30 rotate together. When the friction plate 30 is clamped by the armature 70 and the baffle plate 60 to realize braking, the side wall of the receiving groove 32 will generate a pressure F2' on the fork arm 244. Since the fork arm 244 has a structure of elongated rod, and the brake disc 20 is made of material with good flexibility, when the friction plate 30 is clamped by the armature 70 and the baffle plate 60 and stops rotating, the six fork arms 244 will be subjected to a resistance F2' from the six receiving grooves 32 (the F2' subjected to each fork arm 244 is different), different degrees of bending deformation (deflection) will be generated. Afterwards, the fork arm 244 will return to its initial state due to its own elastic force, and the motor rotor 10 stops rotating. Therefore, the fork arm 244 can be slightly bent and deformed to generate deflection. Therefore, no matter when starting or braking, the U-shaped fork arms 242 and 244 of the brake disc 20 can absorb an impact energy generated by the collision via elastic deformation, thereby protecting other parts such as the reducer in the joint. In addition, compared with the existing single-blade solution, each of the six fork arms 244, 242 is always subjected to a force from only one direction, so as to avoid defects of fatigue damage and fracture easily generated in the conventional single-blade repeatedly receiving larger impact forces from left and right directions, which improves service life and reliability of the brake disc 20.

Referring to FIG. 3 and FIG. 4 together, the bearing 40 is sleeved on an end of the motor rotor 10. A bearing inner ring of the bearing 40 is fixed to the motor rotor 10 by interference fit, and a bearing outer ring of the bearing 40 can rotate freely relative to the bearing inner ring. In this embodiment, the bearing 40 is a deep groove ball bearing, which has characteristics of low frictional resistance and high rotational speed, and is capable of being used in a mechanism that is subjected to radial load or a combined load in which the radial load and an axial load function simultaneously. The motor rotor 10 is further provided with a second positioning boss 16 having an annular shape. An outer diameter of the second positioning boss 16 is greater than an inner diameter of the bearing inner ring of the bearing 40, such that a side of the bearing 40 is capable of abutting against the second positioning boss 16, thereby realizing the positioning of the bearing 40 in the axial direction of the motor rotor 10.

The electromagnet assembly 50 is fixed on the bearing 40. As shown in FIG. 3, the electromagnet assembly 50 includes a housing 52 and an electromagnet 54 received in the housing 52. The housing 52 has a substantially annular shape, and is provided with an annular receiving cavity 522 on a side thereof. The annular electromagnet 54 is fixedly received in the receiving cavity 522 and is opposite to the armature 70. A depth of the receiving cavity 522 is less than a thickness of the housing 52, such that the housing 52 is divided into an inner ring 524 and an outer ring 526. The edges of the inner ring 524 and outer ring 526 are coplanar and connected (see FIG. 4). The inner ring 524 is fixedly sleeved on the bearing outer ring of the bearing 40 and is in interference fit with the bearing outer ring. In this embodiment, the bearing outer ring of the bearing 40 is further coated with a second adhesive layer to enhance the connection strength between the bearing 40 and the electromagnet assembly 50. The second adhesive can also be Loctite 609 glue. The spring assembly 80 is provided on the outer ring 526. Specifically, the outer ring 526 is provided with a plurality of receiving holes 528, and a plurality of spring assemblies 80 are received in the plurality of receiving holes 528, respectively. Each receiving hole 528 extends through both sides of the outer ring 526. The receiving hole 528 further includes a spring receiving portion 5282 and a threaded portion 5284. The spring receiving portion 5282 is opposite to the armature 70, and the threaded portion 5284 is in communication with the spring receiving portion 5282, but is located on a side of the outer ring 526 away from the armature 70. A diameter of the spring receiving portion 5282 is slightly greater than a diameter of the threaded portion 5284.

The spring assembly 80 includes a spring 82, an adjusting screw 84, and a spacer 86. One end of the spring 82 is received in the spring receiving portion 5282 of the receiving hole 528, and the other end of the spring 82 protrudes from the spring receiving portion 5282 and is capable of pushing a side of the armature 70. The adjusting screw 84 is screwed into the threaded portion 5284 of the receiving hole 528, and is capable of moving axially in the threaded portion 5284 by rotating. The spacer 86 is located between spring 82 and adjusting screw 84. Therefore, a position of the adjusting screw 84 in the threaded portion 5284 can be adjusted by an L-shaped wrench, an initial compression amount of the spring 82 can be precisely adjusted (the greater the compression deformation of the spring, the greater the elastic force), and then an elastic resisting force of the spring 82 to the armature 70 can be adjusted, that is, a friction force of the armature 70 against the friction plate 30 can be adjusted. Of course, the spacer 86 can also be omitted, and in that case, the adjusting screw 84 directly abuts against the end of the spring 82. In this embodiment, a number of the spring assemblies 80 is six, and the six spring assemblies 80 are evenly and symmetrically distributed on the outer ring 526 at intervals of 60°.

The armature 70 has a substantially annular shape. The armature 70 is sleeved on the motor rotor 10, and can slide left and right along the axial direction of the motor rotor 10. The armature 70 is located on one side of the brake disc 20 and the friction plate 30, and the baffle plate 60 is located on the other side of the brake disc 20 and the friction plate 30. The baffle plate 60 has a substantially annular shape. The baffle plate 60 is sleeved on the motor rotor 10 and fixed to the electromagnet assembly 50. Specifically, as shown in FIG. 3, the baffle plate 60 is provided with a limiting protrusion 62 extending in an axial direction, the armature 70 is provided with a notch 72 corresponding to the limiting protrusion 62, and the baffle plate 60 is fixed on the outer ring 526 of the electromagnet assembly 50 via extending through a screw 64 of the limiting protrusions 62. Therefore, the baffle plate 60 and the electromagnet assembly 50 are fixed to each other, and do not rotate together with the motor rotor 10, and the armature 70 can slide between the baffle plate 60 and the electromagnet assembly 50 along the axial direction of the motor rotor 10.

The working principle of the aforementioned brake assembly 100 will be briefly described below.

When the joint moves normally without braking, the electromagnet assembly 50 is normally energized, and the electromagnet 54 generates magnetism to attract the armature 70. At this time, the armature 70 will overcome the elastic force of the spring 82 and move in the direction away from the baffle plate 60, thereby separating from the friction plate 30. At this time, a gap between the baffle plate 60 and the armature 70 is greater than a thickness of the friction plate 30, and there is no friction force between the baffle plate 60 and the friction plate 30 or the friction force thereof is far less than a braking force that can be used for braking. At this time, the brake disc 20 is in a state of releasing the braking, and the motor rotor 10 can rotate, thereby driving the brake disc 20 and the friction plate 30 to rotate normally together.

When the joint needs to be braked, the electromagnet assembly 50 is de-energized, the magnetism of the electromagnet 54 disappears, and the armature 70 will move in a direction close to the baffle plate 60 under the action of the elastic force of the spring 82, such that the armature 70 and the baffle plate 60 clamp both sides of the friction plate 30, and a friction torque acting on the friction plate 30 is transmitted to the brake disc 20 via the slightly elastically deformed blades 24, and finally the motor rotor 10 is stopped rotating via the action of the friction torque of the motor rotor 10 via the fixing key 18, and then the braking is realized. It can be understood that the current flowing through the electromagnet assembly 50 can also be gradually reduced, resulting in a gradual increase in the elastic force of the spring 82 on the armature 70, that is, the clamping force of the armature 70 on the friction plate 30 is gradually increased, resulting in a more delicate and precise braking effect.

in conclusion, the brake assembly 100 of this embodiment has the following advantages:

1. The brake friction is adjustable. The plurality of spring assemblies 80 are evenly distributed on the outer ring 526 of the electromagnet assembly 50, and the elastic force of the spring 82 can be adjusted and calibrated via the adjusting screw 84 to adjust the magnitude of the frictional force.
2. The friction structure is new. The conventional structure is that two friction plates are provided between the two movable armatures, and a friction wheel is provided between the two friction plates. The disadvantage of this structure is that there are many parts, the magnetic force required for brake control is large, and the brake pad is easy to wear. The core idea of the present disclosure is that the baffle plate 60 is fixed and the armature 70 is movable, the brake disc 20 and the friction plate 30 are arranged therebetween, and the U-shaped fork arm of the brake disc 20 and the receiving groove 32 of the friction plate 30 are in concave-convex fit. When moving, the brake disc 20 rotates with the friction plate 30; when braking, the baffle plate 60 and the armature 70 clamp the friction plate 30 made of non-metallic material, and the friction plate 30 stops rotating after blocking the brake disc 20, such that only a recoverable bending deformation will be generated on the brake disc 20 without wearing the brake disc 20. A number of parts is small, a required electromagnetic force is small, the control is simple, and the braking precision is high.

3. The fastening method is new. The brake disc 20 and the motor rotor 10 are fastened by the fixing key 18 and 609 glue, which is convenient for mounting and reliable in fastening.

4. The system robustness and functional reliability is stranger. Compared with the existing solution, contact surfaces of the baffle plate 60 and the armature 70 with the friction plate 30 of the present disclosure is larger, and the friction torque generated by the uniform circumferential fit is more stable, which avoids the fatigue damage and fracture caused by the collision between the striker and the brake tooth in the existing solution, thereby improving the working life.

5. The layout of the brake assembly 100 of this embodiment is more compact, which greatly saves the axial space inside the joint. A diameter of the brake assembly 100 can be within 60 mm, a thickness thereof can be within 20 mm, and the total weight thereof is lighter.

6. All the parts of the present disclosure are evenly and symmetrically distributed in a circumferential direction, which has a good dynamic balance effect.

7. In the present disclosure, the structure is simple, which can be designed and produced in a modularized manner, is suitable for a wide range of application scenarios of rotary brakes, and can also be used in series with multiple brake structures in one system.

Figure 6:
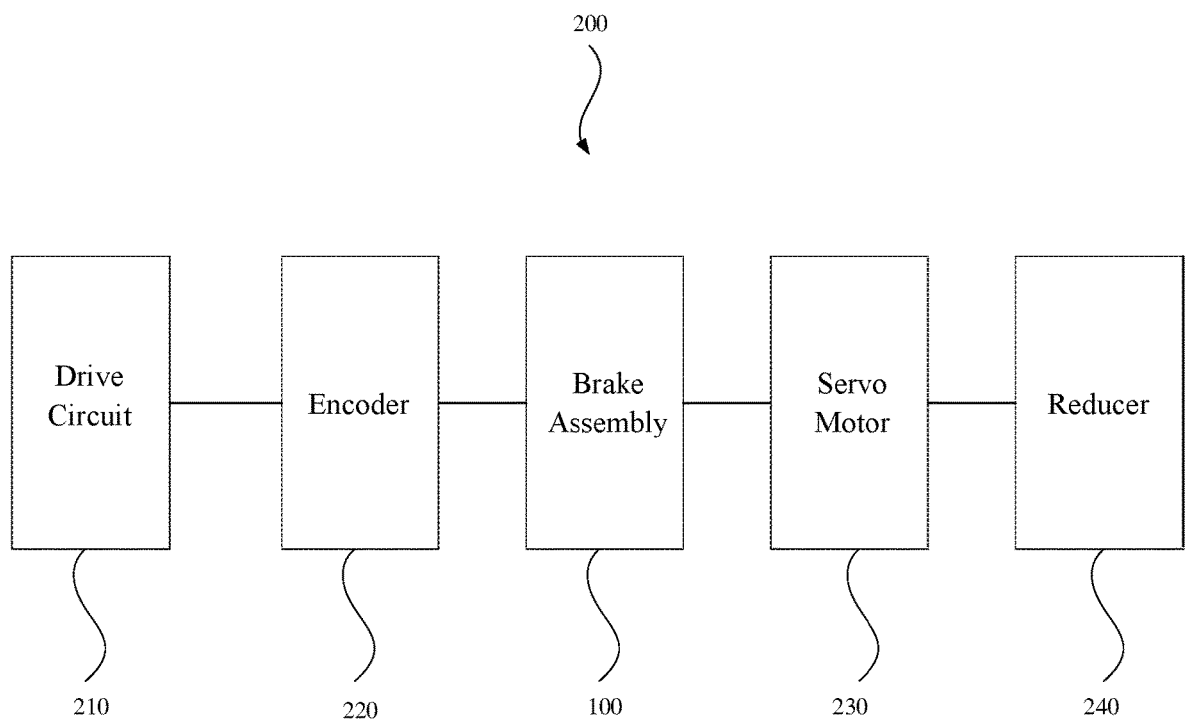
FIG. 6 is a block diagram of a joint actuator according to an embodiment.

FIG. 6 is a block diagram of a system connection structure of joint actuator 200 for a robot according to an embodiment. The joint actuator 200 mainly includes: a drive circuit 210 configured to precisely control the motor output shaft; a photoelectric pulse encoder 220 configured to measure a speed of a joint output end; a servo motor 230 with a Hall sensor configured to provide driving force output; a harmonic reducer 240 configured to reduce the rotational speed and increase a driving torque. The joint actuator 200 also includes the brake assembly 100 located between the servo motor 230 and the encoder 220. The servo motor 230 includes the motor rotor 10.

FIG. 7 shows an industrial robot 300 with multiple degrees of freedom (DOF). The robot has six axes, and each contact of the axes is driven by an actuator. The robot includes a plurality of robotic arms 320 and a plurality of joints 340, the plurality of robotic arms 320 are connected in sequence, adjacent robotic arms 320 are connected by the joints, and the joint is provided with the joint actuator 200.

The technical features of the aforementioned embodiments may be combined arbitrarily. To simplify the description, not all the possible combinations of the technical features in the above embodiments are described. However, all of the combinations of these technical features should be considered as within the scope of the present disclosure, as long as such combinations do not contradict with each other.

The aforementioned embodiments only represent several embodiments of the present disclosure, and the descriptions thereof are relatively specific and detailed, but should not be construed as a limitation on the scope of the patent of the present disclosure. It should be noted that, for a person of ordinary skill in the art, several variations and improvements may be made without departing from the concept of the present disclosure, and these are all within the protection scope of the present disclosure. Therefore, the protection scope of the present disclosure shall be subject to the appended claims.

What is claimed is:

1. A brake assembly, comprising:
   a motor rotor;
   a brake disc fixed on the motor rotor;
   a friction plate fixed to and surrounding the brake disc;
   a bearing rotatably sleeved on the motor rotor;
   an electromagnet assembly fixed on the bearing;
   a baffle plate fixed to the electromagnet assembly and located on one side of the friction plate;
   an armature slidably sleeved on the motor rotor and located on another side of the friction plate, wherein the armature is located between the brake disc and the electromagnet assembly; and
   a spring assembly disposed between the armature and the electromagnet assembly;
   wherein when the electromagnet assembly is de-energized, the armature is pushed by the spring assembly to move in a direction towards the baffle plate, such that the friction plate is clamped by the armature and the baffle plate to realize braking;
   wherein an outer edge of the brake disc extends radially to form a plurality of blades, and an inner edge of the friction plate is provided with a plurality of receiving grooves configured to receive the blades, each of the plurality of blades includes two fork arms that are spaced apart, the two fork arms are in contact with two opposite side walls of a respective one of the receiving grooves, respectively.

2. The brake assembly of claim 1, wherein the motor rotor is provided with a key slot, an inner edge of the brake disc is provided with a positioning groove, the brake assembly further comprises a fixing key, and the brake disc is fixed on the motor rotor via the fixing key inserted into both the key slot and the positioning groove.

3. The brake assembly of claim 2, wherein a surface of the fixing key is coated with a first adhesive layer.

4. The brake assembly of claim 1, wherein the motor rotor is provided with a first positioning boss having an annular shape, the brake assembly further comprises a washer, located between the first positioning boss and the brake disc.

5. The brake assembly of claim 1, wherein a number of the plurality of blades is six, and the six blades are evenly distributed on the outer edge of the brake disc, and a number and positions of the receiving grooves are in one-to-one correspondence with the blades.

6. The brake assembly of claim 1, wherein the brake disc is made of metal material, and the friction plate is made of non-metallic material.

7. The brake assembly of claim 1, wherein the motor rotor is provided with a second positioning boss having an annular shape, and a side of the bearing abuts against the second positioning boss.

8. The brake assembly of claim 1, wherein the baffle plate is provided with a limiting protrusion extending in an axial direction, the armature is provided with a notch corresponding to the limiting protrusion, and the baffle plate is fixed on the electromagnet assembly via a screw extending through the limiting protrusion.

9. The brake assembly of claim 1, wherein the electromagnet assembly comprises a housing and an electromagnet received in the housing, the housing comprises an inner ring and an outer ring, the inner ring is fixed and sleeved on the bearing, the outer ring is fixed to the baffle plate, and the electromagnet is received between the inner ring and the outer ring.

10. The brake assembly of claim 9, wherein the spring assembly is disposed on the outer ring.

11. The brake assembly of claim 10, wherein the outer ring is provided with a receiving hole, the spring assembly comprises a spring and an adjusting screw, the adjusting screw is movably located in the receiving hole, one end of the spring abuts against the adjusting screw, and another end thereof abuts against the armature.

12. The brake assembly of claim 11, wherein a spacer is further provided between the spring and the adjusting screw.

13. The brake assembly of claim 9, wherein a surface of the bearing is coated with a second adhesive layer.

14. The brake assembly of claim 9, wherein the bearing is a deep groove ball bearing.

15. The brake assembly of claim 1, wherein when the electromagnet assembly is energized, a gap between the baffle plate and the armature is greater than a thickness of the friction plate.

16. A joint actuator comprising a motor and the brake assembly according to claim 1.

17. A robot comprising the joint actuator of claim 16.

18. The robot of claim 17, further comprising a plurality of robotic arms and a plurality of joints, wherein the plurality of robotic arms are connected in sequence, adjacent robotic arms are connected by the joints, and each of the joints is provided with the joint actuator.

* * * * *